G. C. AIKEN.
Bee Hive.
No. 22,924. Patented Feb. 15, 1859.
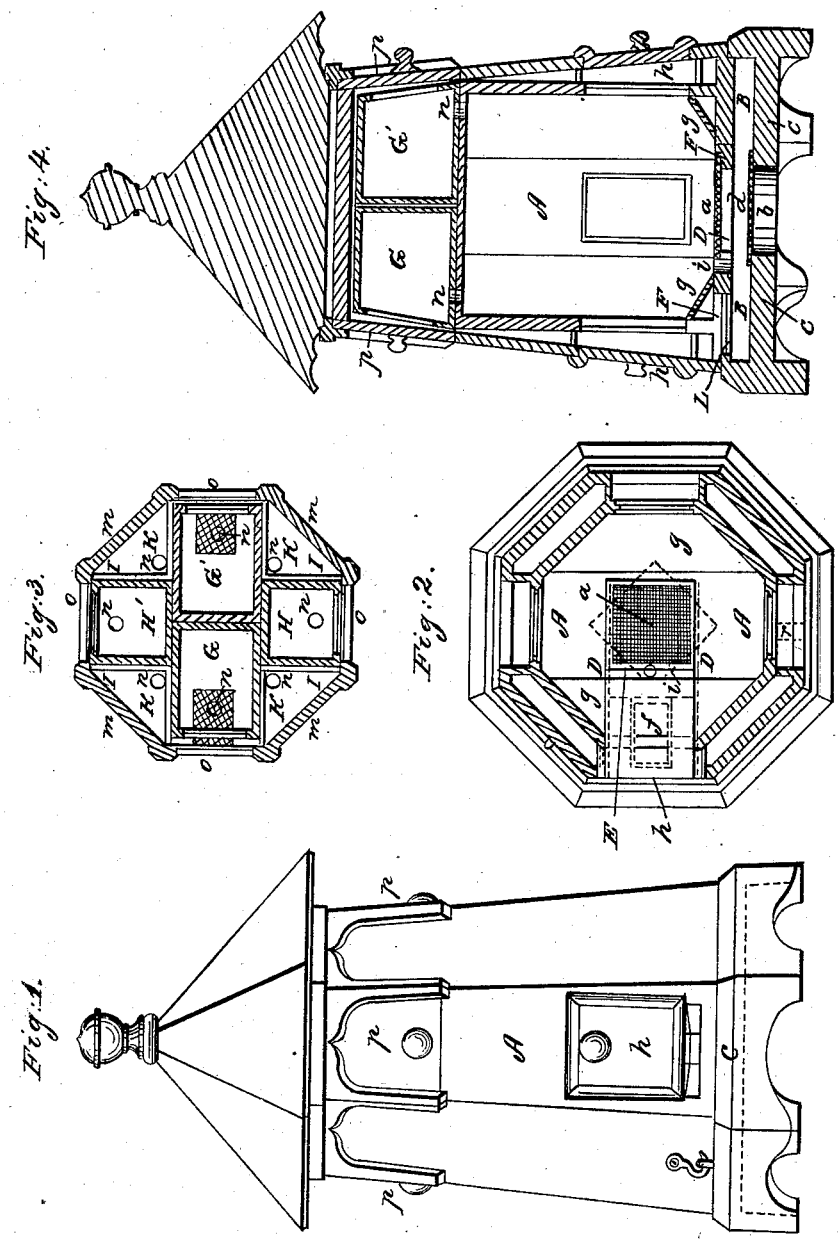

UNITED STATES PATENT OFFICE.

GEO. C. AIKEN, OF NASHUA, NEW HAMPSHIRE.

BEEHIVE.

Specification of Letters Patent No. 22,924, dated February 15, 1859.

*To all whom it may concern:*

Be it known that I, GEORGE C. AIKEN, of Nashua, in the county of Hillsboro and State of New Hampshire, have invented an Improved Beehive; and I do hereby declare that the same is fully described and represented in the following specification and the accompanying drawings, of which—

Figure, 1, is an elevation of it; Fig., 2, a horizontal section of its main chamber; Fig., 3, a horizontal section of its auxiliary honey chambers and boxes; Fig., 4, is a vertical section.

In such drawings, the hive is exhibited in a very compact and ornamental form, it being pyramidal with an octagonal base, and a pitched roof.

In the base or lower part of the hive and below its main chamber, A, I arrange a feeding, exercising and ventilating chamber, B, which opens into the main chamber, A, by a rectangular passage, D, furnished with a slider, E, which in its lower half is made foraminous as shown at $a$. The foraminous part of the slider when in place in the middle of the chamber, A, comes over a hole or passage, $b$, made through the bottom, $c$, of the hive and covered with wire gauze or a foraminous plate or ventilator, $d$. Furthermore, the slider, E, is made with a large opening, $f$, in its front half, through which when the slider is in place, a communication is opened between the chamber, B, and a throat or chamber, F, arranged over the slider and between it and the chamber, A, and formed by the inclined bottom, $g$, of the main chamber which is made to slope in two directions toward the foraminous part of the slider.

The food for the bees may be introduced into the throat, F, and the chamber, B, by means of a doorway, $h$, arranged in the side of the hive as shown in Figs. 1, and 4. In passing from the main chamber, A, into the chamber, B, or vice versa, the bees go through a passage, $i$, arranged in the slider as shown in Fig. 4.

Over the main chamber are four auxiliary honey boxes G, G′, H, H′, and four separate apartments or receivers, I, I, I, I, the latter being formed in part or bounded by the auxiliary honey boxes. In the arrangement of the auxiliary honey boxes two of them, viz., G, G′, are larger than the others and meet or abut together in the middle of the hive while the other two are disposed at right angles to them and lap on them as shown in Fig. 3. This arrangement of the said boxes forms with the sides $m$, $m$, of the hive, four chambers, K, K, K, K, for the reception of bell glasses or tumblers or separate boxes. A passage $n$, should lead from the main chamber A, into each auxiliary chamber or honey box—so as to enable the bees to pass freely from one to the other.

The upper part of the case is provided with four doorways, $o$, $o$, $o$, $o$, arranged therein and furnished with doors, $p$, $p$, as shown in the drawings, the same being to enable the honey boxes to be either removed from or introduced into the hive.

In the operation of this hive, the bees enter it and depart from it through a passage $r$, formed in its side and opening into the main chamber, A, as shown by dotted lines in Fig. 2. The ventilation of the hive takes place at the middle part of its bottom. The dirt or filth of the main chamber is received on the foraminous part of the slide and works through it and the perforated flooring of the chamber B.

The arrangement of the parts of this hive, besides affording to it an ornamental appearance, is very useful, both for the operations of the bees, as well as in point of room and in affording an easy means of cleaning the hive or supplying it with food necessary to the bees in winter.

The case of the hive may be made double and with space to be filled with a non-conductor of heat in order that the hive may be protected from external cold.

I do not claim the invention of a hive having a main chamber placed between a feeding chamber and one or more honey boxes, but What I do claim is—

The arrangement of the boxes G, G′, H, H′, in the hive so as to form with the case thereof, the auxiliary or bell glass chambers, K, K, K, K, in manner as described.

In testimony whereof I have hereunto set my signature.

GEO. C. AIKEN.

Witnesses:
L. M. TYNG,
GEORGE TUTTLE.